US000001421H

United States Statutory Invention Registration [19]

[11] Reg. Number: H1421

Fine

[43] Published: Mar. 7, 1995

[54] VHF SATELLITE BASED RADAR ANTENNA ARRAY

[75] Inventor: Frederick Fine, Silver Springs, Md.

[73] Assignee: United States of America, Washington, D.C.

[21] Appl. No.: 589,751

[22] Filed: Sep. 28, 1990

[51] Int. Cl.[6] ..... H01Q 21/00

[52] U.S. Cl. ..... 343/726; 343/871; 343/880

[56] References Cited

U.S. PATENT DOCUMENTS

| | | |
|---|---|---|
| 4,378,558 | 3/1983 | Lunden . |
| 4,513,291 | 4/1985 | Drabowitch . |
| 4,578,920 | 4/1986 | Bush et al. . |
| 4,658,261 | 4/1987 | Reid et al. . |
| 4,757,323 | 7/1988 | Duret et al. . |
| 4,811,033 | 3/1989 | Ahl et al. . |
| 4,814,784 | 3/1989 | Pallmeyer . |

OTHER PUBLICATIONS

VHF Satellite Based Radar (SBR) Antenna Array Concept, F. Fine, NRL Memorandum Report 5726, pp. 1–21.

*Primary Examiner*—Bernarr E. Gregory

*Attorney, Agent, or Firm*—Thomas E. McDonnell; Edward F. Miles

[57] ABSTRACT

A space based radar antenna array is provided which includes a loop antenna, a narrow cylindrical central support column, and an erectable support structure for connecting the support column to the loop antenna. The loop antenna, the support column and the support structure together form a generally umbrella-like apparatus which is erected to deploy the antenna. When deployed, the loop antenna assumes a circular shape oriented in surrounding relation to the central support column. In the non-deployed state, the loop antenna is collapsed adjacent to the support column. The loop antenna comprises a plurality of printed circuit, end-fire YAGI-UDA antenna units.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VHF SATELLITE BASED RADAR ANTENNA ARRAY

FIELD OF THE INVENTION

The present invention relates to radar antenna arrays and in particular to a space based radar antenna array of generally umbrella-like construction.

BACKGROUND OF THE INVENTION

There currently is interest in having low frequency directional antennas in space. Two design concepts for such an antenna have gained attention. One is a flat phased array. The other is a parabolic dish which mechanically scans. The flat array has the disadvantage that when one steers its beam to the horizon (as one must do to avoid direct reflections from the earth) it sacrifices power (loses effective aperture), about 3 db worth. The parabolic antenna, in order to scan, must be constantly in motion, and this motion must be controlled to an extraordinarily fine degree in order to maintain the antenna properly oriented, and hence effective. This is an extraordinarily difficult engineering task, the solution to which would be a complicated and expensive control system.

Large diameter deployable loop antennas have been developed for use in space. For example, U.S. Pat. No. 4,811,033 (Ahl et al) discloses a space-based antenna generally in the shape of an umbrella wherein the "umbrella" surface comprises parabolic RF reflectors. The antenna is deployed from a stowed configuration the surface contour of the loop antenna elements is automatically controlled. U.S. Pat. No. 4,578,920 (Bush et al) is directed to a space-based antenna including a collapsible-expandable supporting truss structure. Other relevant patents include U.S. Pat. No. 4,757,323 (Duret et al), U.S. Pat. Nos. 4,658,261 (Reid et al) and 4,814,784 (Pallmeyer.)

SUMMARY OF THE INVENTION

Accordingly, an object of the invention is to provide a radar array capable of deployment in space, with a fixed orientation in space.

Another object is to permit such an antenna array to scan the horizon without the loss of power associated with flat arrays.

In accordance with the invention, a space based radar antenna array is provided which includes a loop antenna, a cylindrical support column having first and second ends, a connecting means, including a plurality of support boom assemblies, for connecting the first end of the support column to the loop antenna, and means for moving the boom assemblies between a first position, wherein the boom assemblies extend substantially parallel to the support column such that the loop antenna is disposed in a collapsed state in the vicinity of the support column, and a second position wherein the boom assemblies extend outwardly substantially perpendicular to the support column such that the loop antenna is fully deployed in a circular configuration.

In a preferred embodiment, the loop antenna further comprises a plurality of printed circuit, end-fire YAGI-UDA antenna units. Preferably, the connecting means further comprise a generally circular runner slidably mounted to the support column such that the runner can move along the support column from the first end of the support column to the second end of the support column, the boom assemblies each further comprise an extensor boom pivotally attached to the runner, a secondary boom connecting the top of the support column to the center of the extensor boom, and a main supporting boom connecting the center of the secondary boom to the loop antenna.

Because of its circular geometry, the array does not have the same power fall off when scanning the horizon as does a flat array. Because the array is physically fixed in space, and its beam steerable, it need not have the complicated positioning hardware that would be needed for a mechanical scanning system.

Other features and advantages of the invention will be set forth in, or be apparent from, the detailed description of the preferred embodiments of the invention which follows.

DETAILED DESCRIPTION

Figure 1:
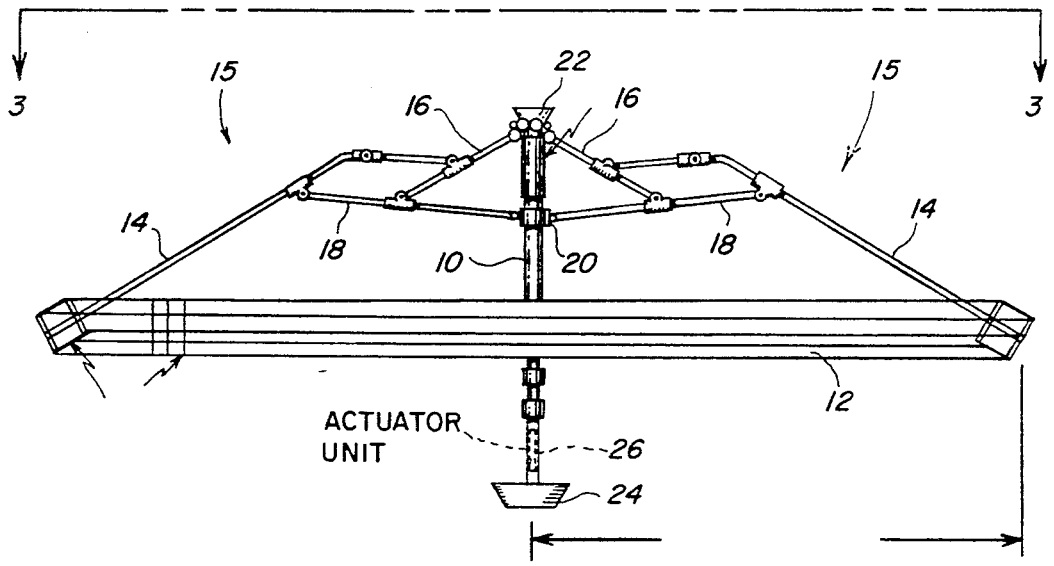
FIG. 1 shows a side elevational view of an embodiment of the invention in a deployed configuration.
Figure 2:
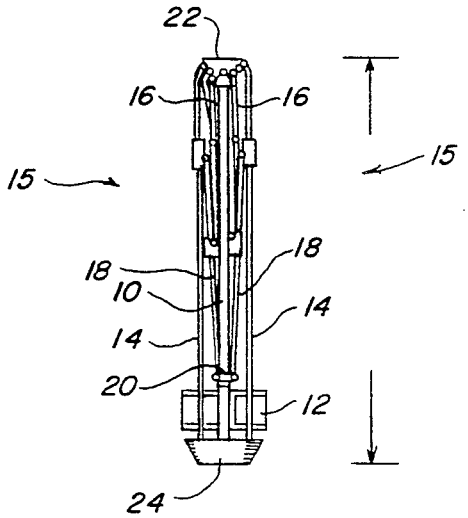
FIG. 2 shows a side elevational view of the embodiment of FIG. 1 in a retracted configuration.
Figure 3:
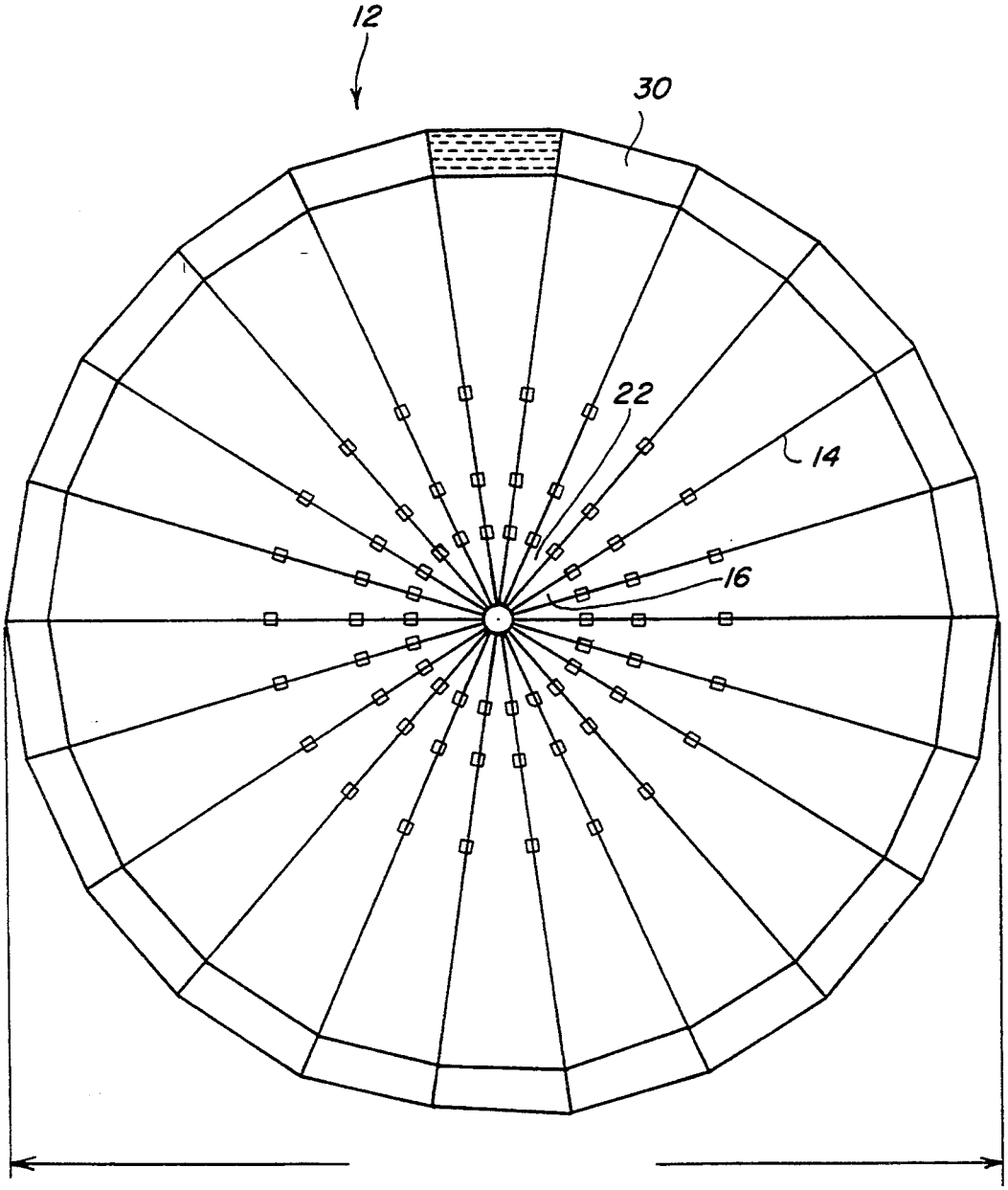
FIG. 3 is a view in the direction of lines 3—3 of FIG. 1, showing the embodiment of FIGS. 1–2 in a deployed configuration.

Referring to FIGS. 1 to 3, an embodiment of the Space Based Radar antenna array of the invention includes, as shown fully deployed in FIG. 1, a narrow generally cylindrical support column 10, a loop antenna structure 12 (best seen in FIG. 3), a runner 20 which is adapted for movement along support column 10, and a plurality of radial supporting structures, generally denoted 15, each comprising a main boom 14, a secondary boom 16, and an extensor boom 18. A propulsion system 22 is provided at one end of support column 10 while a nuclear power system 24 is provided at the opposite end of support column 10. FIG. 2 shows the array in a retracted configuration.

Runner 20 is slidably mounted on the support column 10 such that runner 20 can move along support column 10 from a first position near the propulsion system 22 (as shown in FIG. 1) to a second position near the power system 24 (as shown in FIG. 2) Extensor boom 18 is pivotally attached to runner 20. Secondary boom 16 is, at one end, pivotally attached to support column 10 near propulsion system 22 and, at the other end, pivotally connected the center of extensor boom 18. Main supporting boom 14 is, at one end, pivotally mounted to the center of secondary boom 16 and, at the other end, connected to the loop antenna 12. Therefore, the support column 10, loop antenna 12, radial connecting structure 15, and runner 20 generally describe or constitute an umbrella-like apparatus.

In the deployed configuration of FIG. 1, runner 20 is disposed near the propulsion system 22, as illustrated. Extensor boom 18 projects outward from, and generally perpendicular to, support column 10. Secondary boom 16 and main boom 14 extend outwardly at an angle from support column 10. In the deployed state, loop antenna 12 describes a circular loop generally perpendicular to, and widely spaced from, support column 10.

In the retracted configuration shown in FIG. 2, runner 20 is disposed near the power system 24, extensor boom 18, secondary boom 16, and main boom 14 are disposed parallel to support column 10, and loop antenna 12 is collapsed in the vicinity of the power system 24.

In an exemplary, non-limiting example, support column 12 has a length of 21 feet, and loop antenna 12 has a diameter of approximately 150 feet in the deployed configuration and 13.4 feet in the retracted configuration.

Deployment of the antenna array 10 from the retracted configuration of FIG. 1 to the deployed configuration of FIG. 2 is accomplished as follows. Runner 20 moves from near the power system 24 toward the propulsion system 22. Extensor boom 18 pivots with respect to the runner 20. Likewise, secondary boom 16 pivots, at one end, with respect to the support column 10, and at the other end, with respect to the extensor boom 18. The combined movement of extensor boom 18 and secondary boom 16 extends main boom 14 and thus deploys loop antenna 12. Runner 20 can be moved along the support column 10 by an activator unit, indicated schematically at 26 in FIG. 1, which can comprise a spring loaded actuator located in the main support column 10 and triggered by a pyrotechnic device (not shown).

Figure 4:
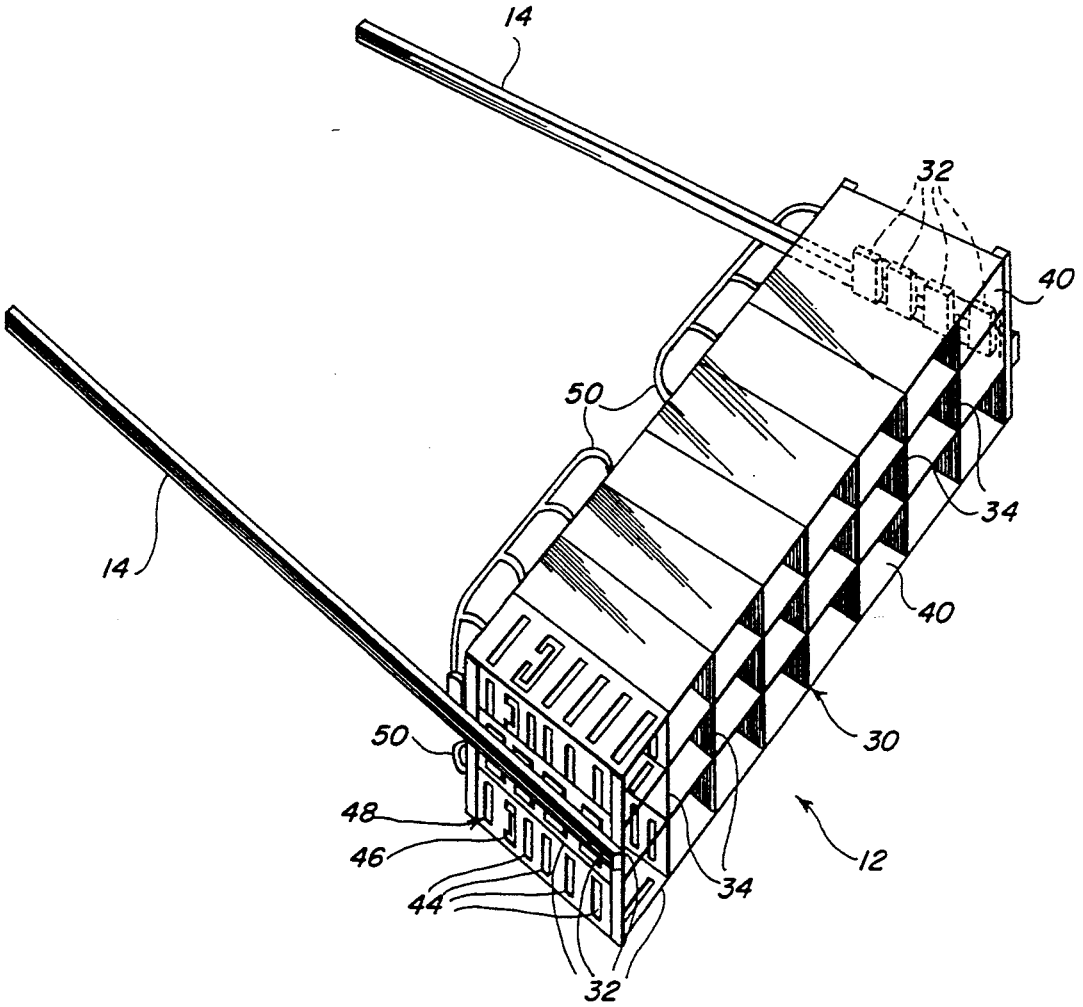
FIG. 4 shows a perspective view of one deployed antenna array segment constructed in accordance with the invention.
Figure 5:
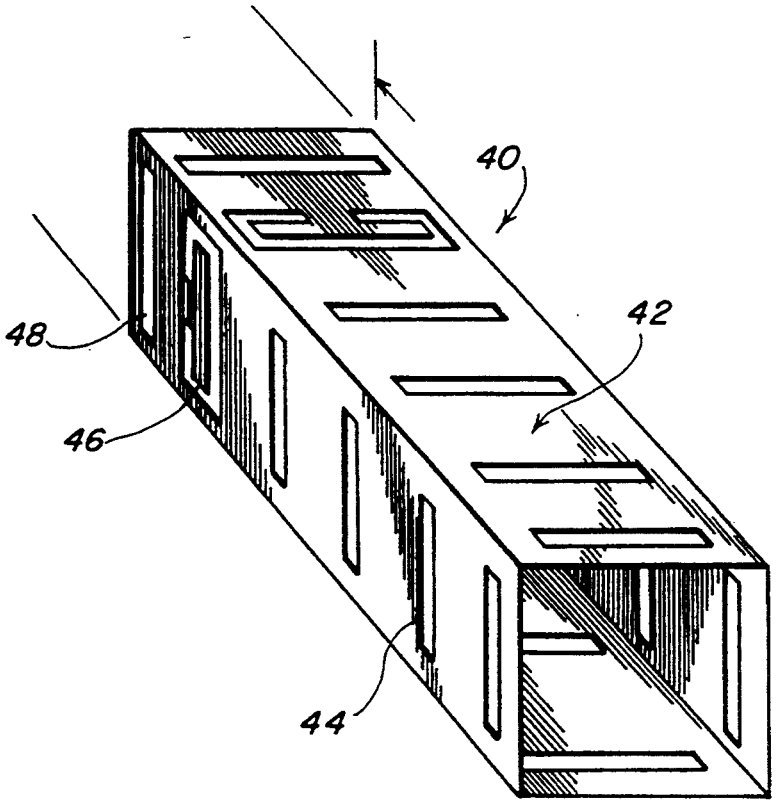
FIG. 5 shows a perspective view of one deployed antenna element cell constructed in accordance with the invention.

Referring to FIGS. 3–5, the structure of the antenna loop 12 will now be more fully described. Loop antenna 12 comprises a plurality of individual antenna segments 30 with FIG. 4 showing one such antenna segment. In an exemplary embodiment, loop antenna 12 comprises twenty-two antenna segments 30. Each antenna segment 30 further comprises a plurality of antenna cells 40 and FIG. 5 shows one such cell 40. In the exemplary embodiment under consideration, each antenna segment comprises sixteen antenna cells configured as shown in FIG. 4 with the antenna segment 30 comprising a two by eight array of antenna cells 40. As shown in FIG. 4, four transmit/receive modules 32 are mounted along each main boom 14 and are each connected to upper and lower rows of antenna cells 40 (the two by eight array referred to above). The rows are vertically spaced by support walls 34 disposed therebetween and cables 50 connect the modules 32 to the antenna cells 40 as is described in more detail below. (When speaking about the component parts of the array, the terms "horizontal" and "vertical," do not refer to the earth and its horizon, but rather to segments 30, and the cells 40 within segments 30. The "horizontal" plane for each segment is that in which both members 14 lie, and the "vertical" plane one which is orthogonal to this horizontal plane. As is seen in FIG. 4, individual cells 40 are oriented symmetrically with respect to these vertical and horizontal directions. Cells 40 also generate two signals polarized orthogonally to one another, and which are also symmetric to these directions.)

Each antenna cell 40 further comprises a plurality of printed circuit, end-fire YAGI-UDA antenna units 42. Preferably, four such antenna units 42 are combined in the shape of a rectangular box to form one antenna cell 40 (FIG. 5). Two opposing antenna units 42 provide vertical polarization. The other two opposing antenna units 42 provide horizontal polarization. The openings of cells 40 are square, and this configuration produces equal vertical and horizontal beamwidths. The base material of each antenna unit 42 comprises bonded nylon fiber reinforced cells or polyester-glass fiber cloth. The sides of each antenna unit 42 are affixed, for example, sewn together to produce a rectangular collapsible box configuration.

Conducting elements are provided on the face of each antenna unit 42. In an exemplary embodiment, the conducting elements for each antenna unit 42 comprise: four straight, transversely extending directors 44 which are 0.408 wavelength long and are spaced sequentially 0.25 wavelength apart, one generally C-shaped reflector 46 which is 0.5 wavelength long spaced 0.25 wavelength from the last director 44 and one transversely fed-element 48 which is 0.45 wavelength long and has a feed spacing of 0.25 wavelength. These conducting elements are constructed by depositing a 1 millimeter coating of silver on the base cloth of the antenna unit 42. A layer of silicone is deposited over the silver for oxidation protection.

The pattern of an antenna unit 42 is:

$$E = E_1 \cdot E_2 = \text{The element pattern} \quad [1]$$

$$E_1 = \frac{\sin[n\pi s/\lambda(1 - \cos\phi) + n\delta/2]}{n \sin[\pi s/\lambda(1 - \cos\phi) + \delta/2]} \quad [2]$$

$$E_2 = \cos(D_r/2 \sin\phi),\ D_r = 2\pi D/\lambda \quad [3]$$

where $E_1$ and $E_2$ are the horizontal and vertical element factors, respectively $D_r = 2\pi D/\lambda$ = The electrical spacing between elements.

n = #of elements s = element spacing $\delta = \pi/n$ $D = \lambda/2$ = Spacing between cells 40.

$\phi$ = deviation from array centerline.

The field pattern is identical for both polarizations.

Referring again to FIG. 3, the complete array loop 12 consists of the two rows of antenna cells 40 referred above, with each row comprising 176 such cells twenty-two segments of eight cells each. Antenna cells 40 are spaced one half wavelength apart in the horizontal dimension and six tenths wavelength apart in the vertical dimension. The structure of cell 40 is maintained in the deployed configuration by tension in the base material of the cell and by tension in the main booms 14.

Figure 6:
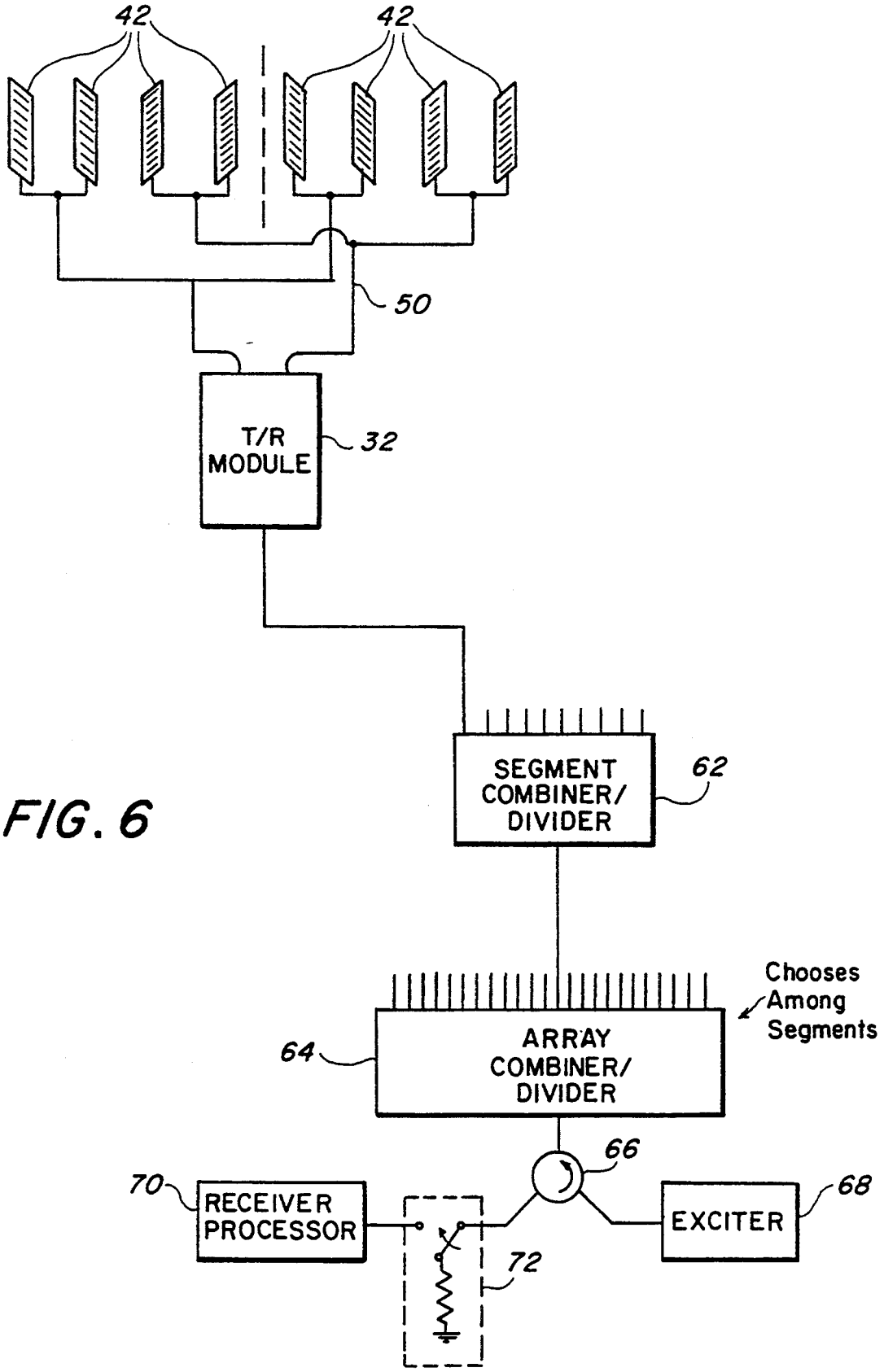
FIG. 6 shows a schematic of the RF circuit of an embodiment of the invention.

FIG. 6 shows the RF circuit for controlling the antenna array. This single RF circuit handles both transmission and reception. RF power is provided by an exciter 68. RF power from exciter 68 is fed through circulator 66 to array combiner/divider 64 where the RF power is divided for distribution to the twenty-two antenna segments 30. Array combiner/divider 64 is connected to each of twenty-two segment combiner/dividers 62 (one of which is shown in FIG. 6). Exciter 68, circulator 66, array combiner/divider 64 and segment combiner dividers 62 are mounted on or in support column 10.

Considering a typical antenna section 30, segment combiner/divider 62 feeds the eight transmit/receive (T/R) modules 32 mentioned above and shown in FIG. 4. Suitable twin-lead cable (not shown) within each of the main support booms 12 transmits the RF power from each segment combiner/divider 62 to the corresponding T/R modules 32. As discussed above, there are eight T/R modules 32 in each segment 30 and each module 32 feeds a vertical row or pair of two antenna cells 40. As was also discussed above in connection with FIG. 4, four T/R modules 32 are mounted on each main boom 14 and are connected to the antenna cells 40 through flexible twin lead cable 50. In particular, each T/R module 32 feeds eight antenna units 42 which form the two antenna cells 40 arranged in a vertical row or pair. The wire separation of the twin lead cable 50 is adjusted for proper impedance match and equal power division. As shown in FIG. 6, each T/R module 32 separately feeds the vertical polarization elements and the horizontal polarization elements.

Figure 7:
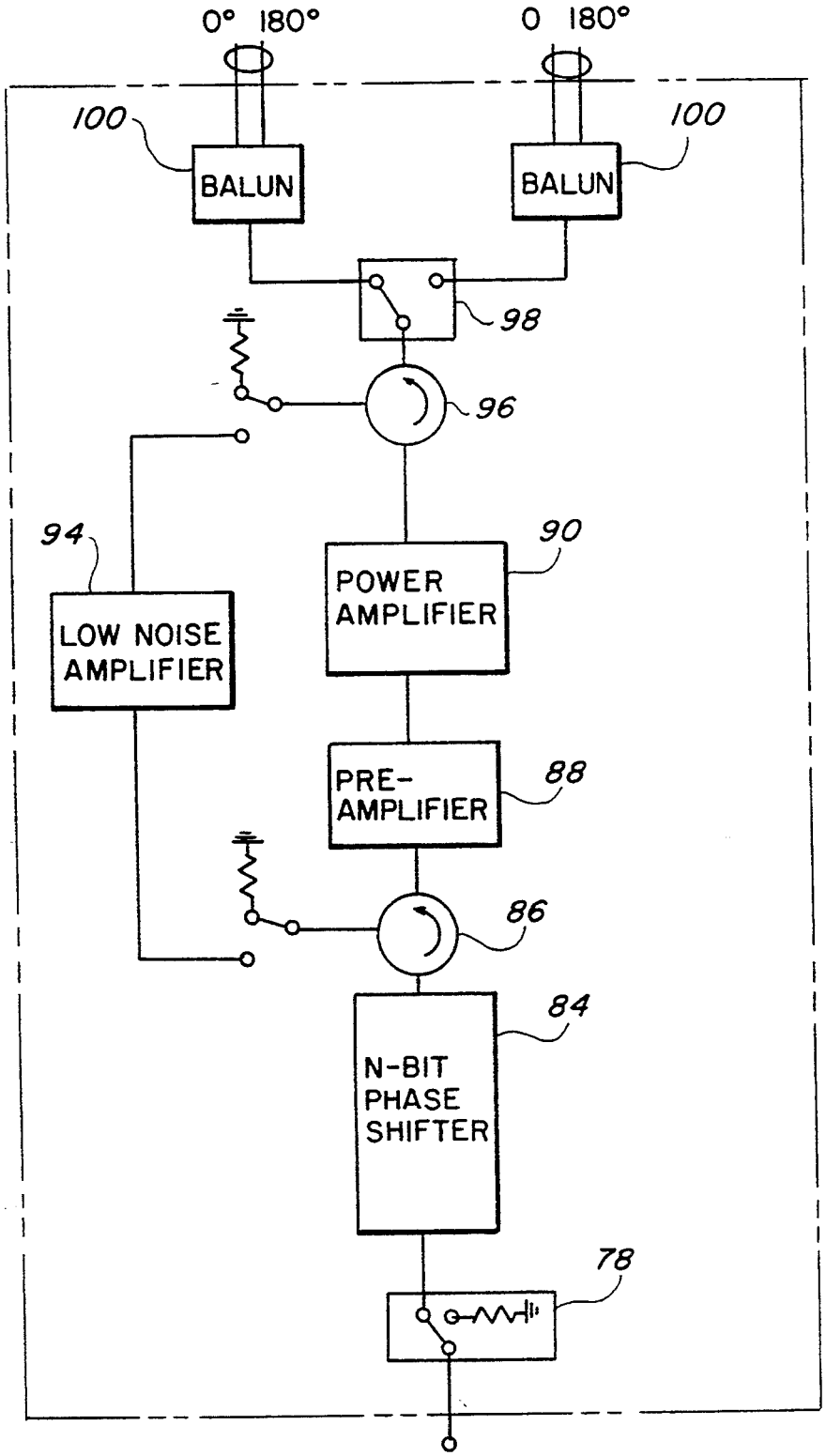
FIG. 7 shows a schematic of the transmit/receive module of an embodiment of the invention.

The internal circuitry of a T/R module 32 is shown in detail in FIG. 7. RF power is received from the segment array divider/combiner 62 and is transmitted into a N-Bit phase shifter 84 via an "on/off switch" 78 which provides for beam stepping. Shifter 84 is preferably a shift register which controls the sequence in which elements of the array fire, so as to steer the array's beam in accordance with well known phased array principles. Phase shifter 84 provides phase compensation and optional vernier beam scan (±1°). Optional DPCA (Displaced Phase Center Antenna) operation can be controlled by having the module phase shifters 84 produce sum and difference patterns.

Properly phase-shifted RF power is transmitted through a passive circulator 86 into a pre-amplifier 88 and an amplifier 90. The amplified RF power is then transmitted through a passive circulator 96 into two BALUNs 100. A polarization switch 98 is provided between the second circulator 96 and the two BALUNs 100. Each BALUN 100 provides RF power to four antenna elements 42 (as shown in FIG. 6).

Passive circulators 86 and 96 and switches 78 and 98 provide separate transmit and receive paths with sufficient isolation to prevent receiver saturation during the transmit cycle.

For radar reception, received RF power is transmitted from the antenna elements 42 through BALUNs 100 and polarizing switch 98 into a low noise reception-amplifier 94. Circulator 96 is properly synchronized to either allow transmission of power to antenna units 42 for radar broadcast or, alternately, reception of power from antenna units 42 into low noise reception-amplifier 94. Independent control of the antenna sidelobes, during the receive mode, is accomplished by a voltage controlled attenuator (not shown) in the low noise amplifier line. Reception amplifier 94 amplifies and transmits the RF signal to N-bit phase shifter 84 via circulator 86. N-bit phase shifter 84 shifts the phase of the RF signals for subsequent processing.

The RF signal is in turn transmitted from the T/R module to the segment combiner/divider 62 which combines the received RF signals for all antenna units 42 within one antenna segment 30. The RF signals are then transmitted to the array combiner/divider 64 for combining with the received RF signals from each of the other array segments 30. Finally, the single combined RF signal is transmitted through circulator 66 to receiver/processor 70. Circulator 66 is properly synchronized to alternately allow for RF transmission from the exciter 68 or RF reception from antenna units 42. Receiver/processor 70 provides for any necessary processing of received RF signals and is preferably connected to a down-link antenna (not shown) for transmitting received radar signals to an Earth-based station.

In use, the maximum of the beam is placed near to the horizon at a depression angle of 32 degrees. The 3 dB half-power beamwidth is 32 degrees. Activating 47 of the 176 total antenna cells 40 in each of the two rows produces the highest gain with the lowest sidelobes. A beamwidth of 3.04 degrees is obtained with a first sidelobe at −22.4 dB and a two way sidelobe max of −44.8 dB. The total array gain at the far range is 26.3 dB and remains constant for all azimuth stepped scan positions. The beam can be step scanned in azimuth (one half beamwidth) for a full 360 degrees or can be slewed to any azimuth position. The 3 dB antenna beam illuminates an area on the surface of the Earth approximately 81,500 square nautical miles.

Details of the system geometry, assuming baseline antenna beamwidths of 3.5° in azimuth and 30° in elevation are provided in Table I.

TABLE I

| SBR GEOMETRY | | |
|---|---|---|
| Satellite Altitude: | 600 | nmi |
| Antenna Beam Depression Angle: | 32 | Deg. |
| Antenna, 3 dB Vertical Beamwidth: | 30 | Deg. |
| Antenna, 3 dB Horizontal Beamwidth: | 3.5 | Deg. |
| Far Range, Grazing Angle: | 5.26 | Deg. |
| Far Slant Range: | 1827 | nmi |
| Near Slant Range: | 895 | nmi |
| Far Ground Range: | 1607 | nmi |
| Near Ground Range: | 614 | nmi |
| Length of Ground Spot: | 994 | nmi |
| Near Ground Spot Width: | 55 | nmi |
| Far Ground Spot Width: | 112 | nmi |

Table II sets forth preferred system parameters for an exemplary preferred embodiment of the Space Based Radar antenna array of the invention.

TABLE II

| RADAR PARAMETERS | | |
|---|---|---|
| Frequency | 200 | MHz |
| Target Radar Cross-Section | 100 | Square Meters |
| Maximum Range to Target | 1827 | nmi |
| Antenna Gain | 26.3 | dBi |
| Receiver Bandwidth | 1 | MHz |
| System Losses | 10 | dB |
| System Noise Temperature | 1000° | K. |
| PRF | 528 | pps |
| Pulse Width | 190 | μs |
| Duty Cycle | 0.1 | |
| Pulse Compression | 190 | |
| Compressed Pulse | 1 | μs |
| Peak Power Transmitted | 7590 | Kw (without pulse comp) |
| Probability of Detection | 0.97 | (s/n = 14 dB) |
| Probability of False Alarm | $10^{-6}$ | |
| Dwell Time | 8 | sec. |
| Peak Power/Module | 850 | Watts (47 modules) |
| Average Power/Module | 85 | Watts |

In an alternative embodiment, improved azimuth scanning is achieved by using vernier phasers in each module 32. Lower sidelobes are achieved by using a receive tapered combining network. Significant gain increases are achieved with increase of aperture. In this alternative embodiment, the deployed array has a diameter of 180 feet. Nine antenna cells 40 are stacked in each vertical row (rather than two cells, as above). Five T/R modules are used per column of cells with one of the five T/R modules feeding only one cell.

This larger array includes a two-dimensional tapered distribution network. A comparison of these two embodiments is shown in Table III.

TABLE III

| HIGHER GAIN AND BASELINE ARRAY COMPARISON | | |
|---|---|---|
| ITEM | FIRST EMBODIMENT | HIGHER GAIN EMBODIMENT |
| Diameter (ft.) | 150 | 180 |
| Vertical Aperture (ft.) | 7.4 | 24.6 |
| No. of Columns of Elements | 176 | 230 |
| No. of Rows of Elements | 2V | 9V |
| No. of Transmit/Receive Modules | 176 | 1150 |
| No. of Simultaneous Active Modules | 47 | 305 |
| No. of Simultaneous Active Columns | 47 | 61 |
| Elevation Distribution | Uniform | Dolph-Tscheby, $30_2$dB S.L |
| Azimuth Distribution | Space-Taper | Space-Taper + $\cos^2$, 10 dB pedestal |
| Gain (dBi) | 26.3 | 29.9 |
| Elevation, 3 dB Beamwidth (Deg.) | 32 | 15.3 |
| Azimuth, 3 dB Beamwidth (Deg.) | 3.04 | 2.77 |
| Peak Sidelobe (one way) dBc | | |
| Azimuth | −22.4 | −33.4 |
| Elevation | −41.9 | −29.2 |
| Avg. Sidelobe (one way), dbi | | |
| Azimuth | −10.8 | −16.7 |
| Elevation | −24.8 | −6.5 |
| Avg. Power/Module, Watts | 85 | 8.3 with 11.5dB dynamic range |
| Weight Est. (pounds) | 17,000 | 23,000 |

Although the invention has been described with respect to the exemplary embodiments thereof, it will be understood by those skilled in the art that variations and modifications can be effected in these embodiments without departing from the scope and spirit of the invention.

I claim:

1. A spaced based radar antenna array comprising, a loop antenna;

a support column having first and second ends;

connecting means, including a plurality of support boom assemblies, for connecting said first end of said support column to said loop antenna; and means for providing movement of said boom assemblies between a first position wherein said boom assemblies extend substantially parallel to said support column such that said loop antenna is disposed in a collapsed state in the vicinity of the support column, and a second position wherein said boom assemblies extend outwardly substantially perpendicular to said support column such that said loop antenna is fully deployed in a circular configuration.

2. The invention of claim 1, wherein said loop antenna further comprises a plurality of printed circuit, end-fire YAGI-UDA antenna units.

3. The invention of claim 1, wherein said means for providing movement further comprises a generally circular runner slidably mounted to said support column such that said runner can move along said support column from a first position at said first end of said support column to a second portion at said second end of said support column, and wherein said boom assemblies of said connecting means comprise:

an extensor boom pivotally attached to said runner, said extensor boom having a center;

a secondary boom connecting said first end of said support column to said center of said extensor boom, said secondary boom having a center; and a main supporting boom connecting said center of said secondary boom to said loop antenna.

* * * * *